(12) United States Patent
Stolz et al.

(10) Patent No.: US 10,767,738 B2
(45) Date of Patent: Sep. 8, 2020

(54) DRIVE DEVICE WITH SPEED MODULATION GEARBOX

(71) Applicant: VOITH PATENT GMBH, Heidenheim (DE)

(72) Inventors: Tobias Stolz, Satteldorf (DE); Stefan Steiner, Schillingsfuerst (DE); Ralph Burkhardt, Oehringen (DE)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 16/321,202

(22) PCT Filed: Jul. 14, 2017

(86) PCT No.: PCT/EP2017/067830
§ 371 (c)(1),
(2) Date: Jan. 28, 2019

(87) PCT Pub. No.: WO2018/019613
PCT Pub. Date: Feb. 1, 2018

(65) Prior Publication Data
US 2019/0170223 A1    Jun. 6, 2019

(30) Foreign Application Priority Data

Jul. 26, 2016  (DE) .................. 10 2016 213 639
Feb. 23, 2017  (DE) .................. 10 2017 103 696

(51) Int. Cl.
*F16H 3/72*     (2006.01)
*F16H 61/12*    (2010.01)

(52) U.S. Cl.
CPC ............. *F16H 3/727* (2013.01); *F16H 61/12* (2013.01); *F16H 2061/122* (2013.01); *F16H 2200/2005* (2013.01)

(58) Field of Classification Search
CPC .......... F16H 3/725; F16H 3/728; F16H 3/727; F16H 61/12; F16H 2061/122; F16H 2200/2005; F16H 3/72
See application file for complete search history.

(56) References Cited

U.S. PATENT DOCUMENTS 3,503,281 A * 3/1970 Gsching .................. F16D 67/00
                                                    475/32
5,382,132 A   1/1995 Mendel
(Continued)

FOREIGN PATENT DOCUMENTS

DE          612823 A    5/1935
DE         4241141 A1   6/1994
(Continued)

*Primary Examiner* — Huan Le
(74) *Attorney, Agent, or Firm* — Laurence A. Greenberg; Werner H. Stemer; Ralph E. Locher

(57) ABSTRACT

A drive device includes a speed modulation gearbox having a planetary gear mechanism and a casing, a main drive machine which is connected to an input shaft of the speed modulation gearbox, two auxiliary drives, each connected to the planetary gear mechanism via a drive connection. An output shaft of the speed modulation gearbox can be connected to a working machine. The planetary gear mechanism includes a ring gear, a sun gear, a planet carrier and several planet gears. For each auxiliary drive, an additional drive connection with a constant transmission ratio exists between the auxiliary drives and the input shaft or between the auxiliary drives and a driven shaft of the planetary gear mechanism. The additional drive connections can each be engaged or disengaged by a respective switching clutch, wherein the drive connections from the auxiliary drives to the speed modulation gearbox remain engaged in any case.

13 Claims, 5 Drawing Sheets

(56) References Cited

U.S. PATENT DOCUMENTS

| | | |
|---|---|---|
| 2005/0064974 A1 | 3/2005 | Bezian et al. |
| 2005/0113201 A1* | 5/2005 | Kimura .................. F16H 3/724 475/5 |
| 2008/0194369 A1* | 8/2008 | Boutou ................. B60K 6/365 475/5 |
| 2008/0227576 A1 | 9/2008 | Besnard et al. |
| 2011/0042155 A1 | 2/2011 | Tarasinski et al. |
| 2014/0378257 A1* | 12/2014 | White ..................... F16H 3/724 475/5 |
| 2018/0138836 A1 | 5/2018 | Lauter et al. |

FOREIGN PATENT DOCUMENTS

| | | |
|---|---|---|
| DE | 102014210869 A1 | 12/2015 |
| DE | 102015107934 A1 | 11/2016 |
| WO | 2016172742 A1 | 11/2016 |

* cited by examiner

DRIVE DEVICE WITH SPEED MODULATION GEARBOX

BACKGROUND OF THE INVENTION

Field of the Invention

The invention relates to a drive device comprising a speed modulation gearbox having a planetary gear mechanism and a casing, a main drive machine which is connected to an input shaft of the speed modulation gearbox, two auxiliary drives which are each connected to the planetary gear mechanism via a drive connection, and an output shaft of the speed modulation gearbox which can be connected to a working machine, wherein the planetary gear mechanism comprises a ring gear, a sun gear, a planet carrier and several planet gears.

Speed modulation gearboxes are generally driven by independent drives by means of at least two shafts of the planetary gear mechanism so that the rotation speeds are added or subtracted at a further shaft, the output shaft. If one of the drives can be regulated, a stepless speed regulation for the output shaft can be achieved. In the present case, two shafts are driven, wherein one shaft is driven by the main drive machine and one shaft is driven by the two auxiliary drives with regulated rotation speed. A working machine is connected to the third shaft, the output shaft.

From the prior art, drive devices with a speed modulation gearbox are known, in which a main drive machine drives the ring gear of a planetary gear mechanism via the input shaft, and an adjustable auxiliary drive drives the planet carrier via a gear stage, while the working machine is connected to the sun gear via the output shaft. With such a drive device, the rotation speed at the output shaft can be set steplessly within a very broad rotation speed range while the main drive machine is running constantly.

Furthermore, it is possible to drag-start the main drive machine without load, in that the auxiliary drive imprints the rotation speed of the main drive machine during run-up. Only when the main drive machine is close to the nominal rotation speed and hence can apply a high torque is the load slowly accelerated by reducing the rotation speed compensation by the auxiliary drive.

A concrete design with two auxiliary drives each having a separate drive connection to the planetary gear mechanism is shown for example in publication DE 102015107934 A1. To protect from damage, various clutches and brakes are present on the auxiliary drives and on the main drive machine.

Such drive devices are used in particular for driving pumps, compressors or high-power compressors, as used for example in the oil and gas industry or in thermal power stations.

These drive devices however have the disadvantage that they are extremely inflexible in the event of a fault, and the planet carrier is not protected from overspeed if the main drive machine fails during operation or must be isolated from the network. In such a case, the high mass inertia of the drive machine, which is usually much greater than that of the driven working machine, leads to severe acceleration of the planet carrier and auxiliary drives. Unacceptably high rotation speeds may occur at mechanical and electrical components, for example at the planet carrier, and damage these. The clutches available in the prior art can only disengage the auxiliary drives and protect these from overspeed.

SUMMARY OF THE INVENTION

The object of the invention is now to find an improved solution so that said drive device may be configured to be more reliable in the event of a fault and also more economic. In particular for aftermarket fitting in existing systems, an efficiency-improving rotation speed control is achieved with optimal adaptation to existing conditions.

This object is achieved by a drive device as claimed. Further advantageous features of the design according to the invention, which improve the device further, are described in the corresponding dependent claims. The drive device according to the invention is configured such that for each auxiliary drive, an additional drive connection with a constant transmission ratio exists between the auxiliary drives and the input shaft or between the auxiliary drives and a driven shaft of the planetary gear mechanism, wherein said additional drive connections are configured such that they can each be engaged or disengaged by means of a respective switching clutch. It is important that the drive connections between the auxiliary drives and the planetary gear mechanism remain connected irrespective of the switching of the clutches. The two additional drive connections may here act on a common spur gear on the input shaft or on the driven shaft.

Due to the additional drive connections, on failure of the main drive machine, emergency operation via the auxiliary drives becomes possible, or at low rotation speeds the device may be started and operated solely by the auxiliary drives. It is particularly advantageous that, on a fault in the main drive machine, the drive device can be run down under control, wherein the majority of the energy is consumed by the re-acceleration of the auxiliary drives. For this, the clutches can be switched with a targeted delay in order to minimize the load on the clutches. A critical overspeed of the auxiliary drives or planet carrier is thus effectively prevented.

Because two additional drive connections are provided, each with a switching clutch, the individual components and in particular the switching clutches may be designed significantly smaller and hence cheaper, and take up less installation space.

In normal operation, the switching clutches are opened and the additional drive connections are not engaged.

Preferably, the respective additional drive connections are connected via an auxiliary drive gear on the auxiliary drive shaft, and via an intermediate shaft with two intermediate gears or with a stepped intermediate gear, and via a respective spur gear to a common spur gear on the input shaft. Here, the switching clutch is arranged on the respective intermediate shaft and the switching clutch can disengage or engage the respective spur gear.

Alternatively, the respective additional drive connection acts via a respective auxiliary gear on the auxiliary drive shaft, and via a respective spur gear on a common spur gear on the input shaft. Here, the switching clutch is arranged on the respective auxiliary drive shaft and the switching clutch can disengage or engage the respective auxiliary gear.

This gives a great flexibility for optimal adaptation of the drive device to the given peripheral conditions.

In a further embodiment according to the invention, the switching clutches are preferably arranged on a free shaft end. This offers the advantage that the oil supply for the switching clutch may be provided very easily via an axial bore in the shaft.

In a preferred embodiment, a driven shaft of the planetary gear mechanism also forms the output shaft of the speed modulation gearbox. This is particularly advantageous if the input shaft and output shaft are arranged coaxially.

Secondly, it may also be advantageous if a spur gear stage is arranged between a driven shaft of the planetary gear mechanism and the output shaft of the speed modulation gearbox, so that an axial offset exists between the input shaft and the output shaft. In particular for retrofit applications in which a drive device in an existing system is to be replaced, there is greater flexibility for adaptation of the device to given peripheral conditions.

Due to the axial offset, it is also possible that one of the auxiliary drives may be arranged lower and hence the first and the second auxiliary drives arranged at different heights in the z-direction. Although an additional gear stage is provided, it has been found that a significantly smaller installation space is required, and hence greater flexibility results for adaptation to existing geometric peripheral conditions.

In addition, it is advantageous for the center of gravity of the device if one of the auxiliary drives is arranged lower down. Furthermore, the device according to the invention offers much more flexibility in the position of the input and output shafts, since now also gear control clutches with axial offset may be replaced without complex adaptation work on the periphery.

In particular, it is preferred if the main drive machine can be operated only at constant rotation speed, and the auxiliary drives can be operated with regulated rotation speed. In particular with high drive power levels, this allows a more economic implementation. A majority of the drive power may be provided by the constantly running main drive machine. This requires no frequency converters, which saves investment. Preferably, the main drive machine is configured as a medium-voltage motor i.e. with a voltage of more than 1 kV. The rotation speed is regulated via the auxiliary drives which require less power and are preferably configured as low-voltage motors with a voltage of less than 1 kV. Thus the frequency converters required here are smaller and cheaper.

Furthermore it is advantageous to connect the input shaft to the ring gear, the driven shaft to the sun gear, and the auxiliary drives to the planet carrier via a respective drive connection with constant transmission ratio. A device configured in this way is particularly suitable for high rotation speeds at the power output, as required for example on fast-running compressors or large fans.

It is particularly advantageous if the two auxiliary drives are each coupled to the planetary gear mechanism via an auxiliary drive gear and via a respective intermediate shaft with stepped intermediate gears. This allows a particularly flexible design of installation space which can meet widely varying geometric peripheral conditions. This is an important criterion for existing systems.

Preferably, the two auxiliary drives are arranged on the side of the main drive machine. The advantage is that, in the region of the working machine, no further space is required for the drive device on the power output side.

Alternatively, the two auxiliary drives may be arranged on the side of the output shaft, i.e. the working machine, if for example there is no suitable space available on the side of the main drive machine.

Further space saving in the length of the drive device can be achieved if the two auxiliary drives are arranged such that, viewed from the top in the z-direction, they lie mainly or completely inside the casing contour line. With this piggyback design, very compact plants can still be modernized since this variant is particularly compact.

In order to simplify maintenance and service, it is advantageous if the casing is designed to be separable via a separation joint and comprises a casing cover and a casing lower part. Furthermore, the two auxiliary drives may be arranged directly on the casing cover, wherein the speed modulation gearbox and the separation joint are configured such that the casing cover with the two auxiliary drives can be removed while the casing lower part with the main drive machine, planetary gear mechanism and driven shaft, may remain installed. This further simplifies installation and removal.

Further advantageous forms of the invention are explained below with reference to exemplary embodiments shown in the drawings. The features described may advantageously be implemented not only in the combination shown but also combined individually with each other. The figures show in detail:

DESCRIPTION OF THE INVENTION

The figures are explained in more detail below. The same reference signs always refer to the same or similar components or elements.

Figure 1:
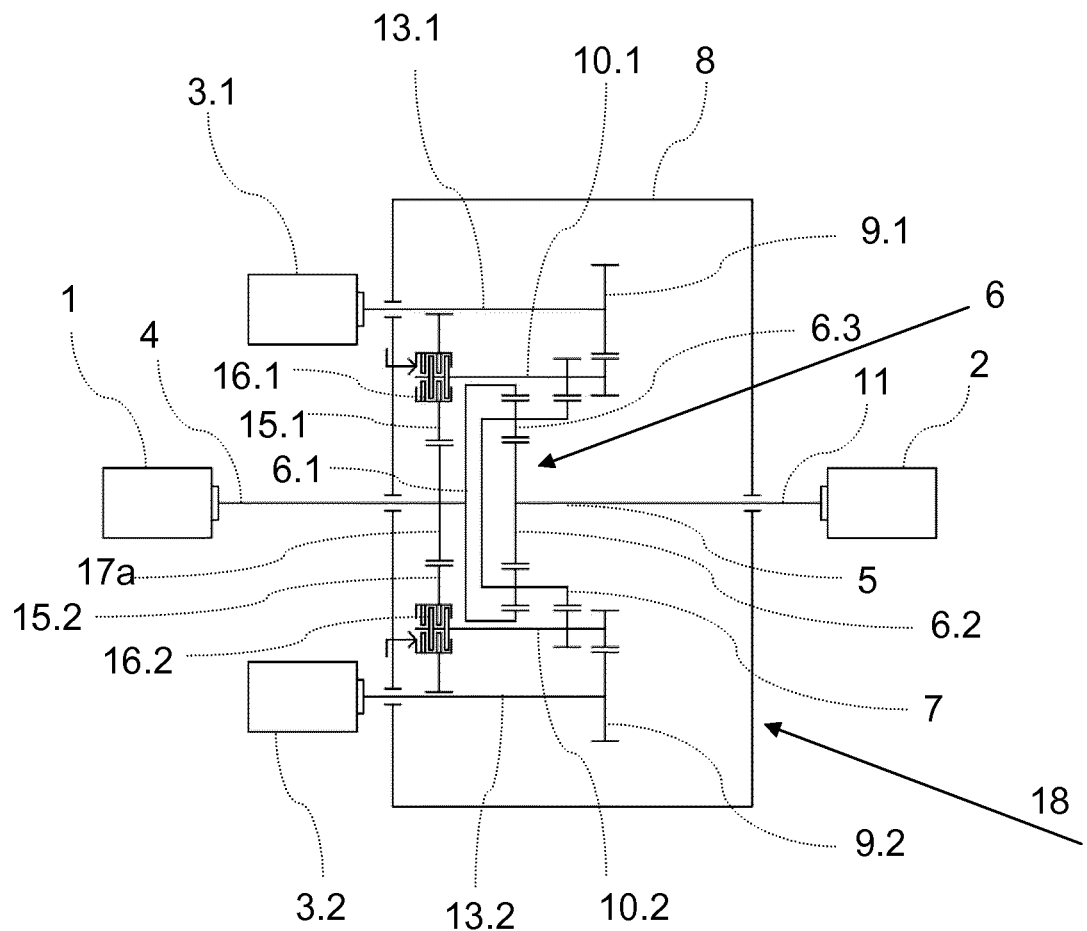
FIG. 1 a drive device according to the invention

FIG. 1 shows in top view a drive device according to the invention which is connected via the output shaft 11 to the working machine 2. The working machine 2 may for example be a pump, a compressor, a fan or a blower. It may also be a conveyor belt drive or a mill or similar machine. In particular, it is a high-power working machine 2 in which it is particularly important to have a drive with high efficiency. Because of the size of the drive, it is then also decisive that the required installation space is not over-large.

The speed modulation gearbox 18 present in the drive device has a casing 8 and comprises a planetary gear mechanism 6. The driven shaft 5 from the planetary gear mechanism is here simultaneously the output shaft 11 of the speed modulation gearbox. The input shaft 4 connects the main drive machine 1 to the ring gear 6.1 of the planetary gear mechanism, and the driven shaft 5 is connected to the sun gear 6.2. The drive connection between the ring gear 6.1 and sun gear 6.2 takes place via the planet carrier 7 with several planet gears 6.3. In addition, the two auxiliary drives 3.1, 3.2 act on the planet carrier 7.

The advantage of connecting the auxiliary drives to the planetary gear mechanism 6 by a respective separate drive connection is that the necessary gear stages and components may be dimensioned smaller than if both auxiliary drives 3.1, 3.2 were connected via a common gear stage. The drive connection in this embodiment takes place via a respective auxiliary drive gear 9.1, 9.2 which sits on the auxiliary drive shaft 13.1, 13.2, and via a respective intermediate shaft 10.1, 10.2 each with two intermediate gears, one of which engages in the external toothing on the planet carrier 7 which is formed as a main gear or is connected to a main gear. A particularly preferred alternative for the intermediate shaft is for the drive connection to take place via a stepped intermediate gear 10.1, 10.2. An advantage of the design of the drive connections described here is that highly variable transmission ratios are possible and despite this, many components, in particular the casing components, may be kept the same.

Furthermore, additional switchable drive connections are present between the auxiliary drives 3.1, 3.2 and the input shaft 4 or driven shaft 5, and serve for example to start the drive device by means of the auxiliary drives 3.1, 3.2 when the main drive machine 1 has stopped, or operate this at low rotation speed, or allow a controlled emergency operation or controlled shut-down on failure of the main drive machine 1.

In all embodiments, the drive connection between the auxiliary drives and the planet carrier remains engaged irrespective of whether the switching clutches are engaged or disengaged.

Connected via the respective switching clutch 16.1, 16.2, a spur gear 15.1, 15.2 sits on each extended intermediate shaft 10.1, 10.2 and engages in the spur gear 17a on the input shaft. The switching clutches 16.1, 16.2 are actuated to switch these additional drive connections between the auxiliary drives 3.1, 3.2 and the input shaft 4. In normal operation, the switching clutches 16.1, 16.2 are disengaged. In emergency operation, on controlled emergency stoppage, or on operation at low rotation speed or for start-up, the switching clutches may be closed so that the additional drive connections come into engagement. Depending on requirements, only one auxiliary drive may also be engaged.

Because this additional drive connection is also present separately for each auxiliary drive 3.1, 3.2, again the switching clutches and further components may be designed smaller and hence cheaper, and take up less installation space.

In the embodiment shown, the switching clutches 16.1, 16.2 are arranged on the free shaft ends of the extended intermediate shafts 10.1, 10.2. This offers the advantage that the oil supply for the switching clutches can take place very easily via axial bores in the intermediate shaft 10.1, 10.2.

Figure 2:
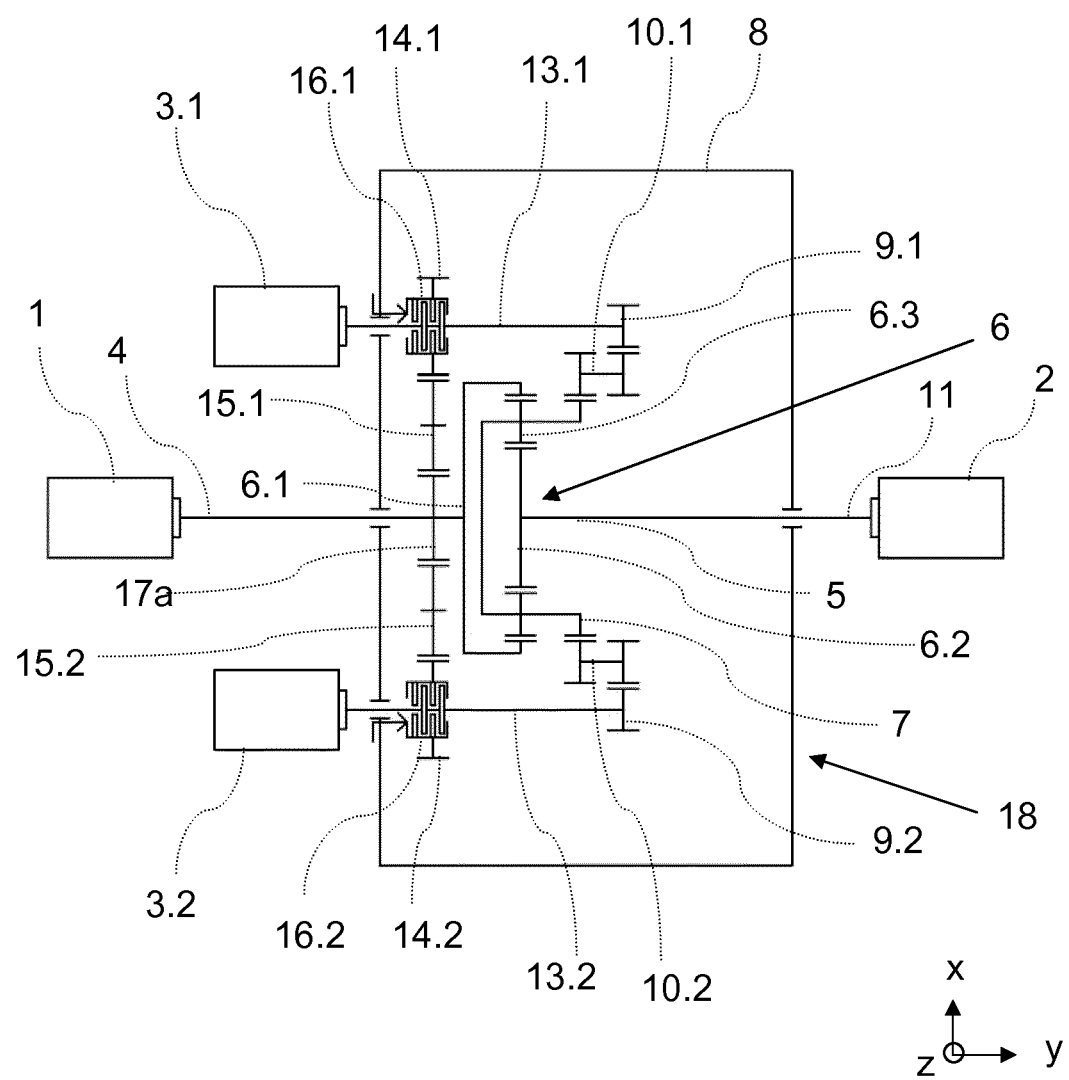
FIG. 2 a further drive device according to the invention

In the variant shown in FIG. 2, the switching clutches 16.1, 16.2 sit directly on the respective auxiliary drive shafts 13.1, 13.2. The auxiliary gears 14.1, 14.2 connected to the switching clutches 16.1, 16.2 each engage in the respective intermediate gear 15.1, 15.2 which acts on the common spur gear 17a on the input shaft 4. The advantage of this design is, amongst others, that no extended intermediate shafts are required, but the input shaft 4 may be influenced directly via simple spur gear stages.

Figure 3:
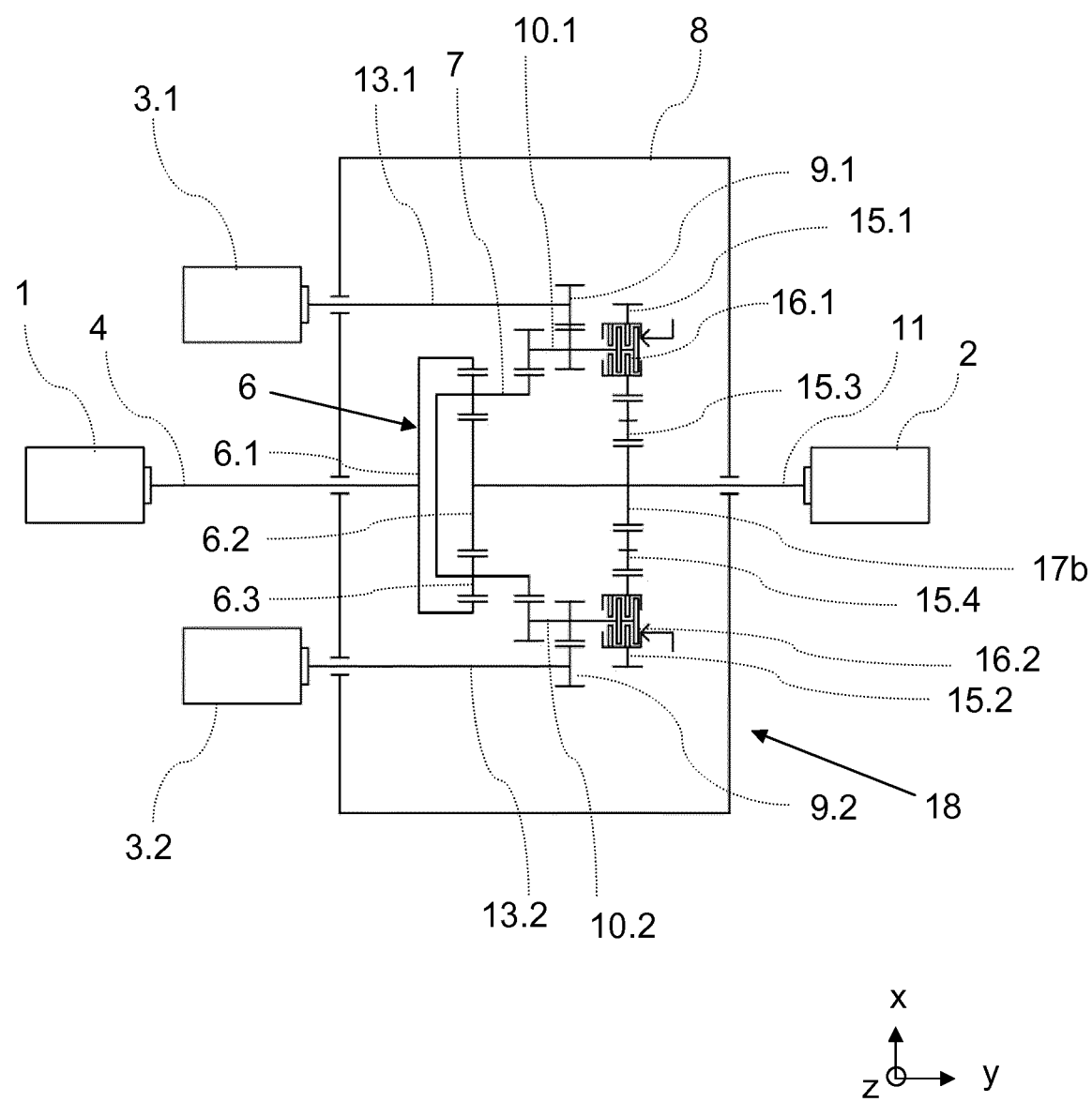
FIG. 3 yet a further drive device according to the invention

FIG. 3 shows an embodiment according to the invention in which the additional switchable drive connections are present between the auxiliary drives 3.1, 3.2 and the driven shaft 5 of the planetary gear mechanism. As in the first exemplary embodiment, the switching clutches 16.1, 16.2 sit on the extended intermediate shafts 10.1, 10.2, but this time on the free shaft end pointing towards the power output side. The spur gears 15.1, 15.2 are connected to the switching clutches. The drive connections act on a common spur gear 17b on the driven shaft via a respective further spur gear 15.3, 15.4.

Figure 4:
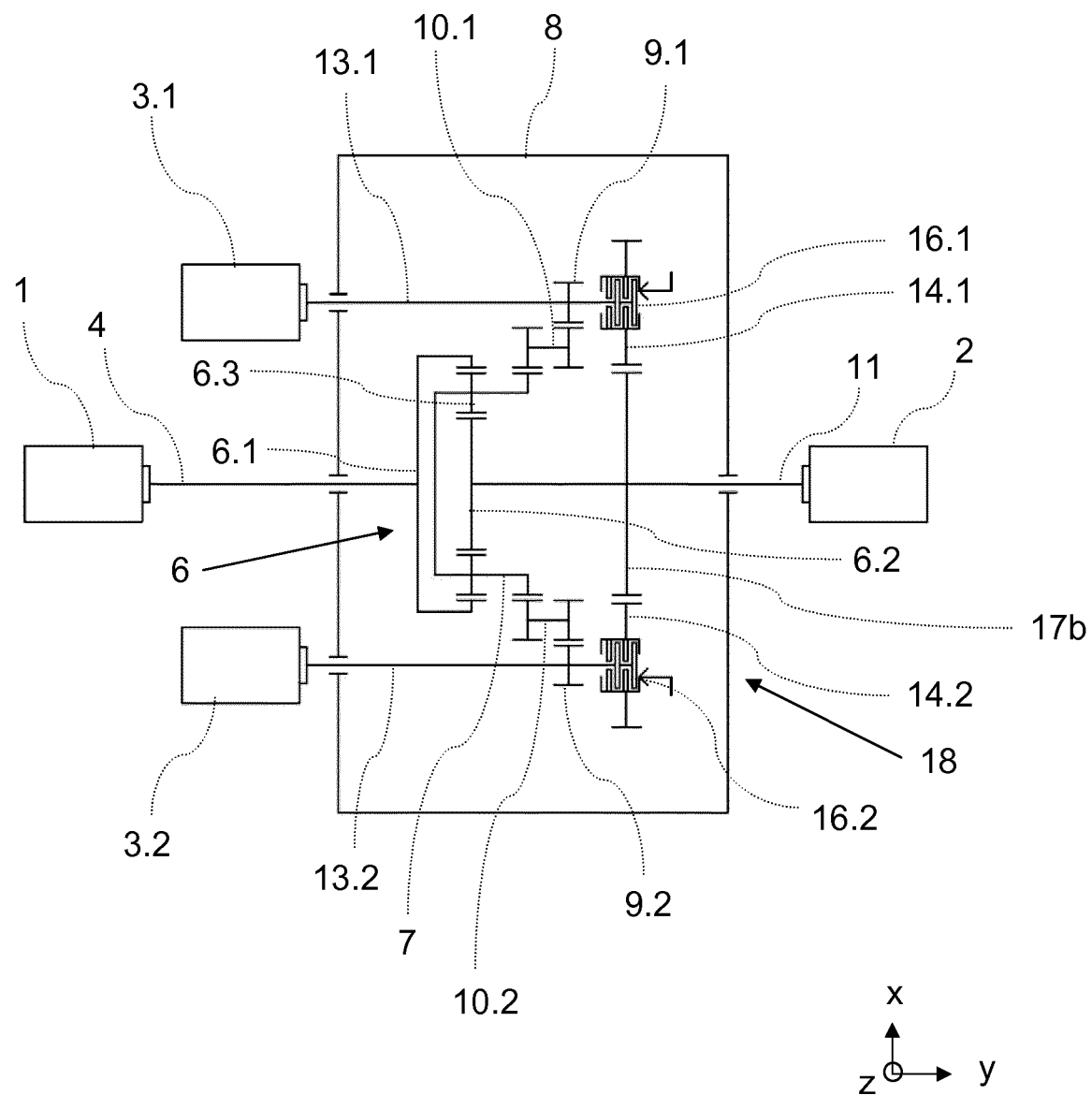
FIG. 4 yet a further drive device according to the invention

FIG. 4 shows a further variant with additional drive connection between the auxiliary drives 3.1, 3.2 and the driven shaft 5 of the planetary gear mechanism.

The switching clutches 16.1, 16.2 each sit on the extended auxiliary drive shaft 13.1, 13.2 and each carry an auxiliary gear 14.1, 14.2 which engages in the common spur gear 17b on the driven shaft 5. Here too, the switching clutches 16.1, 16.2 sit on the free shaft end, which allows an uncomplicated supply of lubricating oil.

This design is particularly suitable for applications in which the working machine 2 is operated at rotation speeds which are not too high.

Figure 5:
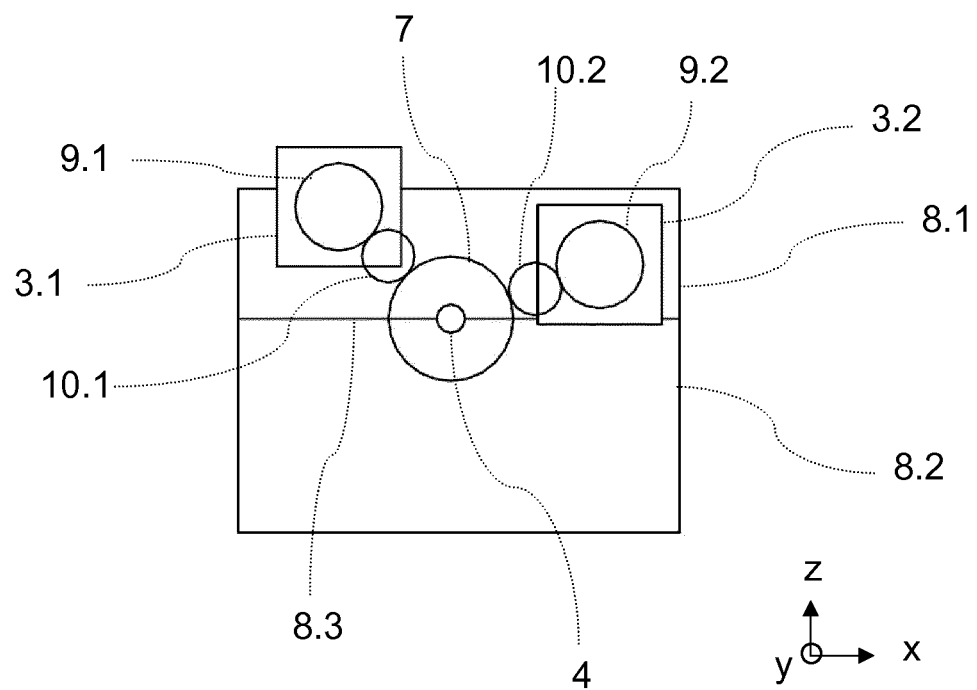
FIG. 5 drive devices according to the invention with auxiliary drives offset in height (front view)

In the front view of FIG. 5, the compactness of the design can be clearly seen. The casing 8 is divided by a separation joint 8.3 into a casing cover 8.1 and a casing lower part 8.2. The auxiliary drives 3.1, 3.2 are both arranged on the casing cover 8.1. This offers advantages for installation and also construction, since the casing cover 8.1 with components mounted therein can always be designed the same irrespective of the desired axial offset.

In this preferred embodiment, the second auxiliary drive 3.2 is positioned lower in the z-direction than the first auxiliary drive 3.1. The first auxiliary drive is present on the side at which the axial offset of the output shaft 11 is provided. Due to the axial offset, there is sufficient space to lower the second auxiliary drive 3.2 advantageously. In a further option, the second auxiliary drive 3.2 may also be arranged on the casing lower part 8.2.

Again, the separate drive connections via the gearwheels 9.1, 10.1 and 9.2, 10.2 between the auxiliary drives 3.1, 3.2 and the planet carrier 7 formed as a main wheel or connected to a main wheel are clearly evident. The further components of the planetary gear mechanism 6 and the spur gear stage 12, and the output shaft 11 are not shown.

Although not explicitly shown, nonetheless for all embodiments a spur gear stage may be provided which is formed by two spur gears and which connects the driven shaft 5 of the planetary gear mechanism to the output shaft 11 of the drive device. Because of the spur gear stage, an axial offset between the input shaft 4 and the output shaft 11 may be designed very flexibly according to requirements. The axial offset may exist not only in the x-direction but also within limits in the z-direction. Thus the drive device may be adapted well to existing conditions, for example for aftermarket fitting in existing systems.

LIST OF REFERENCE SIGNS

1 Main drive machine
2 Working machine
3.1, 3.2 First and second auxiliary drives
4 Input shaft
5 Driven shaft
6 Planetary gear mechanism
6.1 Ring gear
6.2 Sun gear
6.3 Planet gears
7 Planet carrier
8 Casing
8.1 Casing cover
8.2 Casing lower part
8.3 Separation joint
9.1, 9.2 First and second auxiliary drive gear
10.1, 10.2 First and second intermediate shaft with intermediate gears (or first and second stepped intermediate gear)
11 Output shaft
12 Spur gear stage
13.1, 13.2 First and second auxiliary drive shaft
14.1, 14.2 First and second auxiliary gear
15.1, 15.2 First and second spur gear
15.3, 15.4 Further spur gears
16.1, 16.2 First and second switching clutch
17a Spur gear on input shaft
17b Spur gear on driven shaft
18 Speed modulation gearbox x Width
y Length
z Height direction

The invention claimed is:

1. A drive device, comprising:
a speed modulation gearbox having an input shaft, a planetary gear mechanism, a casing and an output shaft to be connected to a working machine;
a main drive machine connected to said input shaft of said speed modulation gearbox, two auxiliary drives each connected to said planetary gear mechanism via a drive connection;
said planetary gear mechanism including a ring gear, a sun gear, a planet carrier and a plurality of planet gears;
for each of said two auxiliary drives, an additional drive connection with a constant transmission ratio connected between said auxiliary drive and said input shaft or between said auxiliary drives and a driven shaft of said planetary gear mechanism;
said additional drive connections being configured to each be engaged or disengaged by way of a respective switching clutch, wherein said drive connections from said auxiliary drives to said speed modulation gearbox remain engaged in any case.

2. The device according to claim 1, wherein the respective said additional drive connection acts via an auxiliary drive gear, and via an intermediate shaft with two intermediate gears or with a stepped intermediate gear on a respective said spur gear, and via said spur gear on a common spur gear on said input shaft, wherein said switching clutch is arranged on the respective said intermediate shaft and said switching clutch is configured to selectively disengage or engage the respective said spur gear.

3. The device according to claim 1, wherein the respective said additional drive connection acts via a respective auxiliary gear on said auxiliary drive shaft and the respective said additional drive connection acts via a respective said spur gear on a common spur gear disposed on said input shaft, wherein said switching clutch is arranged on the respective said auxiliary drive shaft and said switching clutch is configured to selectively disengage or engage the respective said auxiliary gear.

4. The device according to claim 1, wherein said switching clutches are arranged on a free shaft end.

5. The device according to claim 1, wherein said driven shaft of said planetary gear mechanism forms said output shaft of said speed modulation gearbox.

6. The device according to claim 1, which comprises a spur gear stage connected between said driven shaft of said planetary gear mechanism and said output shaft, thus forming an axial offset between said input shaft and said output shaft.

7. The device according to claim 1, wherein said first and second auxiliary drives are arranged at different height levels in a z-direction.

8. The device according to claim 1, wherein said main drive machine can be operated only at a constant rotation speed, and said auxiliary drives are configured for operation with a regulated rotation speed.

9. The device according to claim 1, wherein said input shaft is connected to said ring gear, said driven shaft and hence the output shaft are connected to said sun gear, and said auxiliary drives are connected to said planet carrier via the drive connection with the constant transmission ratio.

10. The device according to claim 1, wherein said two auxiliary drives are coupled to said planetary gear mechanism via a respective auxiliary drive gear and via a respective intermediate shaft each with two intermediate gears or via a respective stepped intermediate gear.

11. The device according to claim 1, wherein said two auxiliary drives are arranged on a side of said main drive machine.

12. The device according to claim 1, wherein said casing is configured to be separable via a separation joint and said casing comprises a casing cover and a casing lower part.

13. The device according to claim 12, wherein said two auxiliary drives are disposed on said casing cover and said speed modulation gearbox and said separation joint are configured to render said casing cover with said two auxiliary drives removable, while said casing lower part with said main drive machine, planetary gear mechanism and driven shaft are not removable and remain installed.

* * * * *